A. B. KING.
Cultivator.

No 64,429.

Patented May 7, 1867.

Witnesses
Frank Millward
H. G. Webber

Inventor:
A. B. King
By Knight Bro
Attys

United States Patent Office.

ABRAHAM B. KING, OF CAMDEN, OHIO.

Letters Patent No. 64,429, dated May 7, 1867.

---

CULTIVATOR.

---

The Schedule referred to in these Letters Patent and making part of the same.

---

TO WHOM IT MAY CONCERN:

Be it known that I, ABRAHAM B. KING, of Camden, Preble county, Ohio, have invented a new and useful Cultivator; and I hereby declare the following to be a full, clear, and exact description thereof, reference being had to the accompanying drawings, making part of this specification.

The object of this invention is to provide a cultivator which can be used with two horses, or be separated into two cultivators, each one complete and appropriate for use with a single horse.

Figure 1:
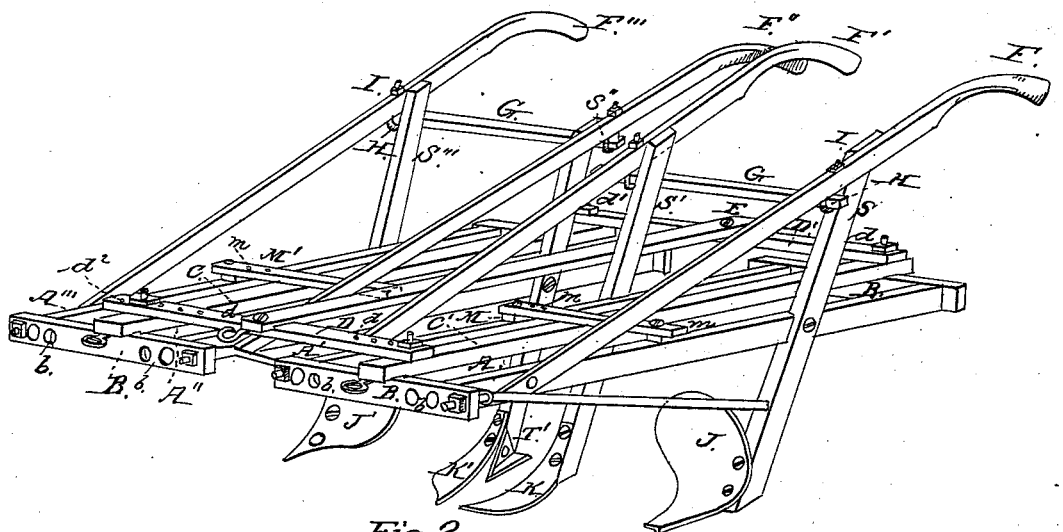
Figure 1 is a perspective view of a cultivator of my invention in the double or two-horse form.
Figure 2:
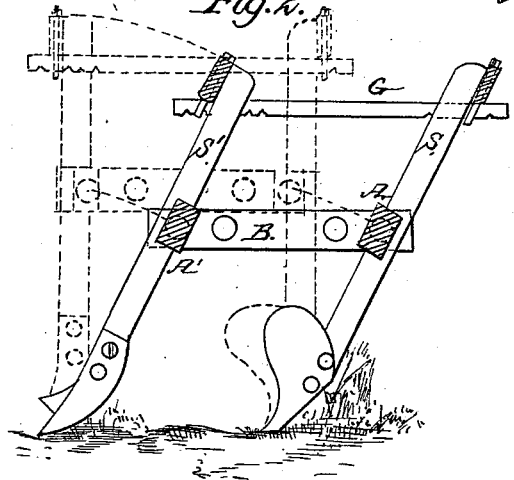
Figure 2 shows one part of the same in the form used for one horse.

A A' A" A''' are longitudinal beams, pivoted at each end to end pieces B. The said pieces B are also connected together by longitudinal draught-beams C C', to which are bolted adjustable cross-pieces D D' for coupling the two sides of the cultivator together, and these cross-pieces D D' are connected in their centres by draught-beam E. In the double form the cultivator has four handles F F' F" F''', each connected in the usual manner from its beam near the forward end to the top of the sheth-posts S S' S" S'''. In place of the usual stretcher-bar or round, the handles have stretchers, G, on their lower sides, held to place by screw-threaded hooks or staples H, fitted with nuts I, the said stretcher having notches on the under side for said staples to enter. At the bottom the posts are armed with ploughs, the two outer ones, J J', being larger than the two inner ones, K K', the outer ploughs being shown in position to turn the furrow toward the centre, and the inner ploughs to throw the earth from the young corn so as not to cover up or break down the same. Each of the inner posts is armed on its inner side with a horizontal cutter, T T', intended to break up the ground on each side of the plants beneath the surface, facilitating the admission of air and the spreading of the roots; and as the cutter cuts in the direction that the roots of the corn spread themselves, namely, horizontally, no damage will be caused by the cutting of the same. The clevises L by which the implement is drawn are screwed fast into metal nuts, sunk in the wood so that the eye may be turned in a vertical or horizontal direction to accommodate either an "open-ring" or double-tree clevis. From beam A to A' and from A" to A''' are bolted pieces M M', which serve with the stretchers to hold the frame rigid when desired, both from their being bolted fast to the beams, and also from their bearing upon the rectangular draught-beams C C'. The cultivator, whether in its single or double form, admits of lateral adjustment by means of the holes b d m, in the cross-pieces B D D' and M M' respectively, and staple notches in stretchers G. When the pieces M' M' are taken from the beams, and the staples H slightly loosened, owing to the beams A A' A" A''' being pivoted in the cross-pieces B, the framework of the cultivator is allowed a transverse swinging motion on the ploughs which will be found advantageous in turning at the ends of rows or in ploughing crooked rows of corn. This position of the cultivator is shown in its single form in fig. 2, where the dotted red lines show its upright or rectangular position, and the black lines its inclined position.

I claim herein as new, and of my invention—

1. The arrangement of two outer cultivators F A S J F''' A''' S''' J', and two inner and smaller ones F' A' S' K F" A" S" K', so coupled together by the pieces G M D, and their described accessories, as to be held rigid, or to be swung from side to side, or to be separated into two distinct double-share cultivators, in the manner described.

2. The arrangement on the inner (or land) side and in rear of a cultivator share of one or more independently attached laterally projecting blades or cutters T, substantially as and for the purpose stated.

In testimony of which invention I hereunto set my hand.

ABRAHAM B. KING.

Witnesses:
    GEO. H. KNIGHT,
    JAMES H. LAYMAN.